(12) United States Patent
Batchelor et al.

(10) Patent No.: US 7,429,558 B2
(45) Date of Patent: Sep. 30, 2008

(54) AZETIDINIUM MODIFIED POLYMERS AND FABRIC TREATMENT COMPOSITION

(75) Inventors: Stephen Norman Batchelor, Wirral (GB); Paul Hugh Findlay, Wirral (GB); Joseph Edward Hunter, Liverpool (GB); Andrew Philip Parker, Wirral (GB); Stephen Paul Rannard, Wirral (GB)

(73) Assignee: Unilever Home & Personal Care division of Conopco, Inc., Greenwich, CT (US)

( * ) Notice: Subject to any disclaimer, the term of this patent is extended or adjusted under 35 U.S.C. 154(b) by 143 days.

(21) Appl. No.: 10/501,499

(22) PCT Filed: Dec. 10, 2002

(86) PCT No.: PCT/EP02/13959

§ 371 (c)(1),
(2), (4) Date: Jul. 14, 2004

(87) PCT Pub. No.: WO03/059967

PCT Pub. Date: Jul. 24, 2003

(65) Prior Publication Data

US 2005/0060812 A1    Mar. 24, 2005

(30) Foreign Application Priority Data

Jan. 18, 2002    (EP) .................................. 0201165

(51) Int. Cl.
C11D 3/37 (2006.01)
C11D 3/28 (2006.01)
C08F 20/34 (2006.01)

(52) U.S. Cl. .................... 510/515; 510/276; 252/8.63
(58) Field of Classification Search ............... 8/115.51; 510/276, 515; 252/8.63
See application file for complete search history.

(56) References Cited

U.S. PATENT DOCUMENTS

| | | | |
|---|---|---|---|
| 3,702,799 A | 11/1972 | Lewis | |
| 3,705,076 A | 12/1972 | Usala | |
| 4,156,775 A * | 5/1979 | Evani et al. | 528/421 |
| 4,198,269 A | 4/1980 | Evani et al. | |
| 4,536,552 A | 8/1985 | Killat et al. | |
| 5,510,004 A * | 4/1996 | Allen | 162/168.2 |
| 5,534,038 A * | 7/1996 | Evans | 8/507 |
| 6,197,880 B1 | 6/2001 | Nigam | |
| 6,927,319 B2 * | 8/2005 | Davis | 800/266 |

FOREIGN PATENT DOCUMENTS

| | | |
|---|---|---|
| DE | 12 58 604 | 1/1968 |
| EP | 0 016 623 | 10/1980 |
| EP | 0 403 336 | 12/1990 |
| EP | 0 987 556 | 2/2000 |
| EP | 1 096 056 | 5/2001 |
| EP | 1 096 060 | 5/2001 |
| WO | 92/07124 | 4/1992 |
| WO | 93/13063 | 7/1993 |
| WO | 93/13142 * | 7/1993 |
| WO | 97/42287 | 11/1997 |
| WO | 98/29530 | 7/1998 |
| WO | 99/06469 | 2/1999 |
| WO | 99/27065 | 6/1999 |
| WO | 99/54541 | 10/1999 |
| WO | 00/08127 | 2/2000 |
| WO | 00/15747 | 3/2000 |
| WO | 00/15748 | 3/2000 |
| WO | 01/25386 * | 4/2001 |
| WO | 01/27232 | 4/2001 |
| WO | 01/31112 | 5/2001 |
| WO | 01/31113 | 5/2001 |
| WO | 01/59053 | 8/2001 |
| WO | 01/63037 | 8/2001 |

OTHER PUBLICATIONS

International Search Report, PCT/EP 02/13959, dated Jul. 3, 2003—5 pp.
GB Search Report, 0201165.8, dated Jul. 31, 2002—1 pp.

* cited by examiner

*Primary Examiner*—Lorna M. Douyon
*Assistant Examiner*—Amina Khan
(74) *Attorney, Agent, or Firm*—Alan A. Bornstein

(57) ABSTRACT

The invention relates to a fabric treatment composition which comprises a self-crosslinking polymer possessing pendant azetidinium groups. A first aspect of the invention comprises an azetidinium functionalized polymer containing primary or secondary amine groups. Cross-linking reactions between the azetidinium group and primary or secondary amine groups do not form quaternary groups and consequently do not result in a charged, cross-linked polymer. This lack of charge is believed to overcome the problems of stain fixing and dye adsorption. A second aspect of the present invention subsists in an azetidinium functionalized polymer of which the monomers comprise: an amino-acrylate and/or amino-alkacrylate monomer, and, optionally, further non-amino acrylate and/or alkacrylate monomer. A third aspect of the present invention provides a textile treatment composition which comprises an azetidinium functionalized polymer in accordance with the first or second aspect of the invention and a textile compatible carrier.

9 Claims, No Drawings

AZETIDINIUM MODIFIED POLYMERS AND FABRIC TREATMENT COMPOSITION

FIELD OF THE INVENTION

The invention relates to a self-crosslinking polymer functionalised with azetidinium groups and to a fabric treatment composition which comprises the polymer. The invention further relates to the use in a domestic washing cycle or a tumble dryer of said composition.

BACKGROUND OF THE INVENTION

A broad range of textile material treatments are known which involve the use of polymeric materials, both for treatment of textile materials in the form of whole cloth and in the form of finished garments. Some of these polymers are substantive. Many of these treatments are used in the garment supply chain to modify the 'finish' of garments.

Polyamide-epichlorohydrin resins are one particular class of materials which are known for the treatment of both keratinaceous and cellulosic materials. These resins are also well-known in the paper industry as alkaline curing wet-strength resins.

The epichlorohydrin resins are sometimes referred to as amine-epichlorohydrin resins and polyamine-epichlorohydrin resins (the two terms being used synonymously) although these terms encompass both the amine and amide resins and their derivatives.

Typical resins are formed by the reaction of polyamines such as diethylenetriamine or triethylenetetramine with C2-C12 dicarboxylic acids such as oxalic, succinic, glutaric or adipic acids. The polyamine/polyamides so produced are then functionalised by reaction with epichlorohydrin (1-chloro-2,3-epoxypropane). The resulting resins are essentially linear polymers which contain azetidinium and epichlorohydrin functional groups.

These resins can cross-link or react with substrates as a result of the functional groups. During the curing reaction, covalent bonds are formed between polymers and fibres and between polymer molecules themselves.

WO 98/29530 gives a typical structural formula, including a repeat unit, of a polyamide-polyamine material as:

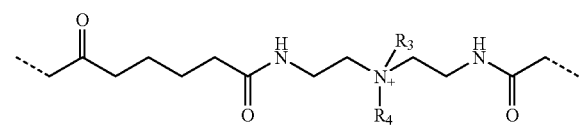

where R3 can be epichlorohydrin or an azetidinium group. While R3 or R4 can also be hydrogen according to the specification, it is quite clear that this is a quaternary species and not a di-protonated secondary amine. Modifications of this basic structure are found, for example, in WO 99/006469, where the polyamine is reacted with a functional polyol before the reaction with epichlorohydrin.

It has been determined that the use of self-crosslinking polymers bearing the azetidinium group can impart many benefits to fabrics containing cellulosic materials (e.g. cotton). These benefits include improved wear resistance, reduced pilling, improved colour definition, reduced wrinkling and improved perfume longevity.

WO 92/07124 describes the use of these resins on regenerated cellulose as a dyeing aid and to reduce fibrillation. It is believed that the molecules function as a dying aid because they retain their cationic character after cross linking to attract anionic dyestuffs. Unfortunately, this can cause fugitive dyes to be absorbed onto said fabric leading to unwanted changes in appearance. The cationic charge can also make certain stains more difficult to remove, as the polymers tend to bind the stain to the surface.

It is believed that the reason for the above-mentioned problems is that the pre-functionalised polyamine/polyamide molecule only contains secondary amines. When a polyamine is treated with excess epichlorohydrin according to a typical method to produce an azetidinium derivative, 50% of these secondary amines are converted into cationic azetidinium groups and 35% are converted into gamma-chlorohydrin groups. The remaining 15% of the amines cross-link and hence become tertiary. The consequence of this is that there are no secondary amines remaining in the polymer after the epichlorohydrin treatment.

During the internal cross-linking reaction between an azetidinium group and a gamma chlorohydrin the azetidinium ring opens leaving a tertiary nitrogen but the corresponding chlorohydrin is converted to a cationic, quaternary group. Thus the overall charge on the polymer is unchanged. The mechanism is illustrated below.

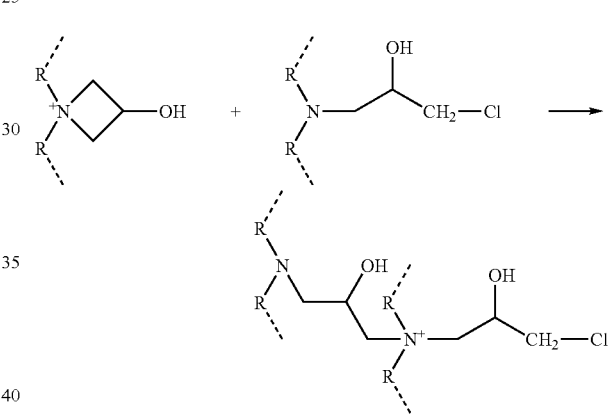

BRIEF DESCRIPTION OF THE INVENTION

We have determined that improved textile treatment polymers can be made which have secondary or primary nitrogen atoms available for a cross-linking reaction with the azetidinium group.

Accordingly, the first aspect of the invention comprises an azetidinium functionalised polymer containing primary and/or secondary amine groups.

Cross-linking reactions between the azetidinium group and primary or secondary amine groups does not form quaternary groups and consequently does not result in a charged, cross-linked polymer. This lack of charge is believed to substantially reduce the problems of stain fixing and dye adsorption. In the context of the present invention the term 'amine' does not include amides.

Particular benefits are obtained if the polymer is synthesised from acrylate-functional monomers, thereby allowing further functionality to be incorporated into the polymer.

Accordingly, a second aspect of the present invention subsists in a azetidinium functionalised polymer of which the monomers comprise:
a) an amino-acrylate and/or amino-alkacrylate monomer, and, b) optionally, further non-amino acrylate and/or alkacrylate monomer.

Typically, the polymers are epihalohydrin modified to form azetidinium groups.

A third aspect of the present invention provides a textile treatment composition which comprises an azetidinium functionalised polymer in accordance with the first or second aspect of the invention and a textile compatible carrier.

Typical concentrations of the polymers according to the invention in the final product will be such as to give 0.01-1% wt, preferably 0.1-0.2% wt on weight of textile material being treated. Typically products will contain 0.5-10% wt of polymer on product.

DETAILED DESCRIPTION OF THE INVENTION

The polymer is preferably synthesised from an amine-containing acrylate or alkyl-acrylate monomer, with or without other monomers which do not contain an amine. Polymers formed form these monomers have pendant primary or secondary amine groups. These polymers can then be modified (e.g. with epichlorohydrin) to give the azetidinium functionality.

The Amine-Containing Polymers:

The preferred amine/acrylate monomers have the general structure given below:

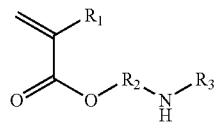

where
$R_1$ is hydrogen or a $C_1$-$C_6$ alkyl,
$R_2$ is $C_1$-$C_6$, alkyl, alkoxy or repeating units thereof, typically $C_2$ alkyl, and,
$R_3$ is hydrogen or $C_1$-$C_6$ alkyl, alkoxy or repeating units thereof Typically, $R_1$ will be hydrogen or methyl, i.e. the monomer will be an acrylate or methacrylate. Typically $R_2$ will be a two-carbon unit. While the substituents $R_2$ and $R_3$ can comprise alkoxy repeat units, such as glycol ether it is preferable that both are saturated alkyl chains. These alkyl chains may be linear or branched.

These polymers can be reacted in the normal manner to give polyacrylate polymers.

In this class of molecules the nature of the $R_3$ substituent will determine whether the polymer has pendant primary or secondary amine groups. Where the substituent is hydrogen then the polymer will have pendant primary amines, otherwise the pendant group will be secondary.

Non-limiting examples of suitable amine-containing acrylate monomers for the polymers of the invention include 2-Aminoethyl methacrylate. In this case R1 is methyl, R2 is ethyl and R3 is hydrogen. This monomer will give pendant primary amine groups when polymerised.

A further example of a suitable monomer is 2-(tert-butylamino)ethyl methacrylate. In this case R1 is methyl, R2 is ethyl and R3 is t-butyl. In this case the pendant amines will be secondary.

The polymer can be synthesised from a single type of amine-containing monomer or from a mixture of monomers of different structures.

Non-Amine Acrylate Monomers:

Choice of the other (non-amine) monomers enables additional functionality to be added to the polymers. Preferred added functionality includes one or more of improved water solubility, the ability to confer softness to a textile and/or stain/soil repellence. Preferably, the monomers will be of the general formula given below:

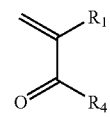

Where:
$R_1$ is hydrogen or a $C_1$-$C_6$ alkyl, alkoxy or repeat units thereof
$R_4$ is a functional group does not contain an amine.

As with the amine monomers discussed above, $R_1$ will typically be hydrogen or methyl, i.e. the monomer will be an acrylate or methacrylate.

By varying $R_4$ it is possible to modify the features of the polymer.

When the $R_4$ group is polar, such as a polyalkylene glycol, the polymer is more water soluble.

When the $R_4$ group is oily, such as a silicone/siloxane or a fatty chain, the polymer has softening properties.

When the $R_4$ group is relatively unreactive, such as a fluorocarbon the polymer confers stain and soil repellence properties.

Mixture of non-amine monomers may be employed to give some or all of these features. Non-limiting examples of suitable monomers are given below.

For water-soluble polymers $R_4$ can be poly(ethyleneglycol) and typical monomers are poly(ethyleneglycol) (meth) acrylates, of the general structure given below:

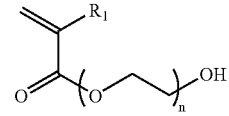

Where R1 is hydrogen or methyl and n is 2-20.

Other monomers which would improve the water-solubility of the polymer include poly(propylene glycol) methacrylate, poly(ethylene glycol) acrylate and poly(propylene glycol) acrylate. As in the case of the monomer described above, n will typically be 2-20.

For added softness $R_4$ can be poly(dimethyl siloxane) mono-methacrylate and/or poly(ethylene glycol) behenyl ether methacrylate For stain/soil repellancy $R_4$ can be one or more of 2,2,3,3, 4,4,5,5-Octafluoropentyl acrylate, 2,2,3,3,4,4,5,5-Octafluoropentyl methacrylate, 2,2,3,3,4,4-Hexafluorobutyl acrylate, 2,2,3,3,4,4-Hexafluorobutyl methacrylate, 1,1,3,3,5,5-Hexafluoroisopropyl acrylate, and, 1,1,3,3,5,5-Hexafluoroisopropyl methacrylate.

The molar ratio of the amine to non-amine monomers is typically in the range 1:10 to 10:1. Preferred polymers have molar ratio's of 5:1 to 1:5, most preferably around 1:1.

Azetidinium Function:

As noted above the polymers may be functionalised by reaction with an epihalohydrin. Preferably, the polymers are functionalised with epichlorohydrin. This reacts with some of the amines to give a reactive polymer containing amines and azetidinium groups which are capable of cross linking.

The preferred level of epihalohydrin used is determined by the type of amine present. For secondary amines no more than a half-molar equivalent of epihalohydrin is used. For primary amines no more than a molar equivalent of epihalohydrin is used. For mixed systems containing both secondary and primary amines the preferred maximum level will be between a half-molar and a molar equivalent. Slightly higher levels of epihalohydrin can be used, preferably no more than 5%, although with higher levels tertiary amines will be formed. Lower levels will lead to a lower degree of modification and less effective cross-linking.

Carriers and Product Form:

The compositions of this invention, when applied to a fabric, may be cured by a domestic curing step including ironing and/or tumble drying, preferably tumble drying. Preferably, these curing steps are carried out at temperatures in the range 60 to 100° C., more preferably from 80 to 100° C.

The compositions of the invention may be used before, during or after a conventional laundry process and are preferably packaged and labelled as such. The laundry process includes large and small processes, and is preferably a domestic process.

Carriers:

Typically, the polymers of the invention will be used in conjunction with a textile compatible carrier.

In the context of the present invention the term "textile compatible carrier" is a component which can assist in the interaction of the polymer with the textile. The carrier can also provide benefits in addition to those provided by the first component e.g. softening, cleaning etc. The carrier may be a detergent-active compound or a textile softener or conditioning compound or other suitable detergent or textile treatment agent.

In a washing process, as part of a conventional textile washing product, such as a detergent composition, the textile-compatible carrier will typically be a detergent-active compound. Whereas, if the textile treatment product is a rinse conditioner, the textile-compatible carrier will be a textile softening and/or conditioning compound.

If the composition of the invention is to be used before, or after, the laundry process it may be in the form of a spray or foaming product.

The polymer is preferably used to treat the textile in the rinse cycle of a laundering process. The rinse cycle preferably follows the treatment of the textile with a detergent composition.

Detergent Active Compounds:

If the composition of the present invention is itself in the form of a detergent composition, the textile-compatible carrier may be chosen from soap and non-soap anionic, cationic, nonionic, amphoteric and zwitterionic detergent active compounds, and mixtures thereof.

Many suitable detergent active compounds are available and are fully described in the literature, for example, in "Surface-Active Agents and Detergents", Volumes I and II, by Schwartz, Perry and Berch.

The preferred textile-compatible carriers that can be used are soaps and synthetic non-soap anionic and nonionic compounds.

Anionic surfactants are well-known to those skilled in the art. Examples include alkylbenzene sulphonates, particularly linear alkylbenzene sulphonates having an alkyl chain length of $C_8$-$C_{15}$; primary and secondary alkylsulphates, particularly $C_8$-$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

Nonionic surfactants that may be used include the primary and secondary alcohol ethoxylates, especially the $C_8$-$C_{20}$ aliphatic alcohols ethoxylated with an average of from 1 to 20 moles of ethylene oxide per mole of alcohol, and more especially the $C_{10}$-$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

Cationic surfactants that may be used include quaternary ammonium salts of the general formula $R_1R_2R_3R_4N^+X^-$ wherein the R groups are independently hydrocarbyl chains of $C_1$-$C_{22}$ length, typically alkyl, hydroxyalkyl or ethoxylated alkyl groups, and X is a solubilising cation (for example, compounds in which $R_1$ is a $C_8$-$C_{22}$ alkyl group, preferably a $C_8$-$C_{10}$ or $C_{12}$-$C_{14}$ alkyl group, $R_2$ is a methyl group, and $R_3$ and $R_4$, which may be the same or different, are methyl or hydroxyethyl groups); and cationic esters (for example, choline esters) and pyridinium salts.

The total quantity of detergent surfactant in the composition is suitably from 0.1 to 60 wt % e.g. 0.5-55 wt %, such as 5-50wt %.

Preferably, the quantity of anionic surfactant (when present) is in the range of from 1 to 50% by weight of the total composition. More preferably, the quantity of anionic surfactant is in the range of from 3 to 35% by weight, e.g. 5 to 30% by weight.

Preferably, the quantity of nonionic surfactant when present is in the range of from 2 to 25% by weight, more preferably from 5 to 20% by weight.

Amphoteric surfactants may also be used, for example amine oxides or betaines.

Builders:

The compositions may suitably contain from 10 to 70%, preferably from 15 to 70% by weight, of detergency builder. Preferably, the quantity of builder is in the range of from 15 to 50% by weight.

The detergent composition may contain as builder a crystalline aluminosilicate, preferably an alkali metal aluminosilicate, more preferably a sodium aluminosilicate.

The aluminosilicate may generally be incorporated in amounts of from 10 to 70% by weight (anhydrous basis), preferably from 25 to 50%. Aluminosilicates are materials having the general formula:

| 0.8-1.5 | $M_2O$. | $Al_2O_3$. | 0.8-6 | $SiO_2$ |
|---|---|---|---|---| where M is a monovalent cation, preferably sodium. These materials contain some bound water and are required to have a calcium ion exchange capacity of at least 50 mg CaO/g. The preferred sodium aluminosilicates contain 1.5-3.5 $SiO_2$ units in the formula above. They can be prepared readily by reaction between sodium silicate and sodium aluminate, as amply described in the literature.

Textile Softening and/or Conditioner Compounds:

If the composition of the present invention is in the form of a textile conditioner composition, the textile-compatible carrier will be a textile softening and/or conditioning compound (hereinafter referred to as "textile softening compound"), which may be a cationic or nonionic compound.

The softening and/or conditioning compounds may be water insoluble quaternary ammonium compounds. The compounds may be present in amounts of up to 8% by weight (based on the total amount of the composition) in which case the compositions are considered dilute, or at levels from 8% to about 50% by weight, in which case the compositions are considered concentrates.

Compositions suitable for delivery during the rinse cycle may also be delivered to the textile in the tumble dryer if used in a suitable form. Thus, another product form is a composition (for example, a paste) suitable for coating onto, and delivery from, a substrate e.g. a flexible sheet or sponge or a suitable dispenser during a tumble dryer cycle.

Suitable cationic textile softening compounds are substantially water-insoluble quaternary ammonium materials comprising a single alkyl or alkenyl long chain having an average chain length greater than or equal to $C_{20}$. More preferably, softening compounds comprise a polar head group and two alkyl or alkenyl chains having an average chain length greater than or equal to $C_{14}$. Preferably the textile softening compounds have two, long-chain, alkyl or alkenyl chains each having an average chain length greater than or equal to $C_{16}$.

Most preferably at least 50% of the long chain alkyl or alkenyl groups have a chain length of $C_{18}$ or above. It is preferred if the long chain alkyl or alkenyl groups of the textile softening compound are predominantly linear.

Quaternary ammonium compounds having two long-chain aliphatic groups, for example, distearyldimethyl ammonium chloride and di(hardened tallow alkyl) dimethyl ammonium chloride, are widely used in commercially available rinse conditioner compositions. Other examples of these cationic compounds are to be found in "Surface-Active Agents and Detergents", Volumes I and II, by Schwartz, Perry and Berch. Any of the conventional types of such compounds may be used in the compositions of the present invention.

The textile softening compounds are preferably compounds that provide excellent softening, and are characterised by a chain melting Lβ to Lα transition temperature greater than 25° C., preferably greater than 35° C., most preferably greater than 45° C. This Lβ to Lα transition can be measured by DSC as defined in "Handbook of Lipid Bilayers", D Marsh, CRC Press, Boca Raton, Fla., 1990 (pages 137 and 337).

Substantially water-insoluble textile softening compounds are defined as textile softening compounds having a solubility of less than $1\times10^{-3}$ wt % in demineralised water at 20° C. Preferably the textile softening compounds have a solubility of less than $1\times10^{-4}$ wt %, more preferably less than $1\times10^{-8}$ to $1\times10^{-6}$ wt %.

Especially preferred are cationic textile softening compounds that are water-insoluble quaternary ammonium materials having two $C_{12-22}$ alkyl or alkenyl groups connected to the molecule via at least one ester link, preferably two ester links. Di(tallowoxyloxyethyl) dimethyl ammonium chloride and/or its hardened tallow analogue are especially preferred of the compounds of this type.

A second preferred type of quaternary ammonium material are materials such as 1,2-bis(hardened tallowoyloxy)-3-trimethylammonium propane chloride and their methods of preparation are, for example, described in U.S. Pat. No. 4,137,180 (Lever Brothers Co). Preferably these materials comprise small amounts of the corresponding monoester as described in U.S. Pat. No. 4,137,180, for example, 1-hardened tallowoyloxy-2-hydroxy-3-trimethylammonium propane chloride.

Other useful cationic softening agents are alkyl pyridinium salts and substituted imidazoline species. Also useful are primary, secondary and tertiary amines and the condensation products of fatty acids with alkylpolyamines.

The compositions may alternatively or additionally contain water-soluble cationic textile softeners, as described in GB 2 039 556B (Unilever).

The compositions may comprise a cationic textile softening compound and an oil, for example as disclosed in EP-A-0829531.

The compositions may alternatively or additionally contain nonionic textile softening agents such as lanolin and derivatives thereof.

Lecithins are also suitable softening compounds.

Nonionic softeners include Lβ phase forming sugar esters (as described in M Hato et al Langmuir 12, 1659, 1666, (1996)) and related materials such as glycerol monostearate or sorbitan esters. Often these materials are used in conjunction with cationic materials to assist deposition (see, for example, GB 2 202 244). Silicones are used in a similar way as a co-softener with a cationic softener in rinse treatments (see, for example, GB 1 549 180).

The compositions may also suitably contain a nonionic stabilising agent. Suitable nonionic stabilising agents are linear $C_8$ to $C_{22}$ alcohols alkoxylated with 10 to 20 moles of alkylene oxide, $C_{10}$ to $C_{20}$ alcohols, or mixtures thereof.

Advantageously the nonionic stabilising agent is a linear $C_8$ to $C_{22}$ alcohol alkoxylated with 10 to 20 moles of alkylene oxide. Preferably, the level of nonionic stabiliser is within the range from 0.1 to 10% by weight, more preferably from 0.5 to 5% by weight, most preferably from 1 to 4% by weight. The mole ratio of the quaternary ammonium compound and/or other cationic softening agent to the nonionic stabilising agent is suitably within the range from 40:1 to about 1:1, preferably within the range from 18:1 to about 3:1.

The composition can also contain fatty acids, for example $C_8$ to $C_{24}$ alkyl or alkenyl monocarboxylic acids or polymers thereof. Preferably saturated fatty acids are used, in particular, hardened tallow $C_{16}$ to $C_{18}$ fatty acids. Preferably the fatty acid is non-saponified, more preferably the fatty acid is free, for example oleic acid, lauric acid or tallow fatty acid. The level of fatty acid material is preferably more than 0.1% by weight, more preferably more than 0.2% by weight. Concentrated compositions may comprise from 0.5 to 20% by weight of fatty acid, more preferably 1% to 10% by weight. The weight ratio of quaternary ammonium material or other cationic softening agent to fatty acid material is preferably from 10:1 to 1:10.

Textile Treatment Products

The composition of the invention may be in the form of a liquid, solid (e.g. powder or tablet), a gel or paste, spray, stick or a foam or mousse. Examples include a soaking product, a rinse treatment (e.g. conditioner or finisher) or a main-wash product. The composition may also be applied to a substrate e.g. a flexible sheet or used in a dispenser which can be used in the wash cycle, rinse cycle or during the dryer cycle.

Liquid compositions may also include an agent which produces a pearlescent appearance, e.g. an organic pearlising compound such as ethylene glycol distearate, or inorganic pearlising pigments such as microfine mica or titanium dioxide ($TiO_2$) coated mica.

Liquid compositions may be in the form of emulsions or emulsion precursors thereof.

Composition may comprise soil release polymers such as block copolymers of polyethylene oxide and terephthalate.

Other optional ingredients include emulsifiers, electrolytes (for example, sodium chloride or calcium chloride) preferably in the range from 0.01 to 5% by weight, pH buffering agents, and perfumes (preferably from 0.1 to 5% by weight).

Further optional ingredients include non-aqueous solvents, perfume carriers, fluorescers, colourants, hydrotropes, antifoaming agents, antiredeposition agents, enzymes, optical brightening agents, opacifiers, dye transfer inhibitors.

In addition, compositions may comprise one or more of anti-shrinking agents, anti-wrinkle agents, anti-spotting agents, germicides, fungicides, anti-oxidants, UV absorbers (sunscreens), heavy metal sequestrants, chlorine scavengers, dye fixatives, anti-corrosion agents, drape imparting agents, antistatic agents and ironing aids. The lists of optional components are not intended to be exhaustive.

In order that the invention may be further and better understood it will be described below with reference to several non-limiting examples.

EXAMPLES

Polymers were synthesised using the following methods

Example 1

Preparing Aminoethylmethacrylate Hydrochloride

A 500 ml 2 neck round bottomed flask was charged with 2-aminoethanol hydrochloride (46.2 g, 0.47 m) and methacryloyl chloride (49.11 g, 0.47 mols). To this hydroquinone (1 mol %, 0.5 g) was added to prevent polymerisation. The fused mass was then heated to 85-100° C. with cautious stirring until no more hydrogen chloride evolved (12 h). The amino ester hydrochloride formed was recrystallised from dry dichloroethane and vacuum dried to give a white crystalline solid (63 g, 84%).

($\delta$H 500 MHz; $CDCL_3$) 1.95 (3H, s, $CH_3$) 3.66 (2H, m, —$CH_2$—) 4.5 (2H, t, J 5 Hz, —$CH_2$—) 5.62 (H, s, vinyl CH) 6.27 (H, s, vinyl CH) 8.38 (3H, bs, $NH_3^+$).

Example 2

Polymerising Aminoethylmethacrylate Hydrochloride with Oligoethyl-Methacrylate Monomethyl Ether (M.wt. 430) 1:1 Molar Ratio Aminoethylmethacrylate hydrochloride (5 g, 0.03 mols, 1 equivalent), oligoethylmethacrylate monomethyl ether (M. wt. 430) (13 g, 0.03 mols 1 equivalent) and AIBN (0.18 g, 1% w/w) were dissolved in water (180 ml). The solution was degassed via the freeze-pump-thaw method and purged with nitrogen. The flask was sealed and the solution stirred with heating at 80° C. for 12 hours. The polymer solution was then freeze dried and the polymer re-dissolved in THF. This organic solution was then added dropwise to vigorously stirring chilled (−20° C.) hexane to give the polymer as a white precipitate. The precipitate was then filtered off and washed with a further amount of chilled non-solvent to give a clear sticky polymer (16.9 g, 94%).

Example 3

Functionalisation with Epichlorohydrin

The previously prepared polymer of example 2 (2 g, 2.88 mmol equivalents based on amine level) was dissolved in water (20 ml) and basified with NaOH solution until pH 10. Epichlorohydrin (0.27 g, 2.88 mmols, 1 equivalent) was added to the solution and stirring was continued at room temperature for either 2 or 4 hours before the solution was acidified with HCl solution to pH 4.

Example 4

Polymerisation of Aminoethylmethacrylate Hydrochloride with Oligoethyl-Methacrylate Monomethyl Ether (M. wt. 430) 1:1 Molar Ratio with Chain Transfer Agent Aminoethylmethacrylate hydrochloride (5 g, 0.03 mols, 1 equivalent), oligoethylmethacrylate monomethyl ether (M. wt. 430) (13 g, 0.03 mols 1 equivalent), butane thiol (0.045 g, 0.25% w/w) and AIBN (0.18 g, 1% w/w) were dissolved in water (180 ml). The solution was degassed via the freeze-pump-thaw method and purged with nitrogen. The flask was sealed and the solution stirred with heating at 80° C. for 12 hours. The polymer solution was then freeze dried and the polymer re-dissolved in THF. This organic solution was then added dropwise to vigorously stirring chilled (−20° C.) hexane to give the polymer as an off-white precipitate. The precipitate was then filtered off and washed with a further amount of chilled non-solvent to give a clear viscous polymer (15.1 g, 84%)

Example 5

Polymerising 2-tert-butylaminoethyl Methacrylate with Oligoethylmethacrylate Monomethyl Ether (M. wt. 430) 1:1 Molar Ratio 2-tert-butylaminoethyl methacrylate (5 g, 27 mmols, 1 equivalent), oligoethylmethacrylate monomethyl ether (M. wt. 430) (11.6 g, 27 mmols 1 equivalent) and AIBN (0.16 g, 1% w/w) were dissolved in anhydrous THF (160 ml). The solution was degassed via the freeze-pump-thaw method and purged with nitrogen. The flask was sealed and the solution stirred with heating at 60° C. for 12 hours.

The solution was then concentrated under vacuum and added dropwise to vigorously stirring chilled (−20° C.) hexane to give the polymer as a white precipitate. The precipitate was then filtered off and washed with a further amount of chilled non-solvent to give a clear sticky polymer (14.95 g, 91%)

Example 6

Polymerisation of 2-tert-butylaminoethyl Methacrylate with Oligoethylmethacrylate Monomethyl Ether (M. wt. 430) 1:2 Molar Ratio with Chain Transfer Agent 2-tert-butylaminoethyl methacrylate (5 g, 27 mmols, 1 equivalent), oligoethylmethacrylate monomethyl ether (M. wt. 430) (23.2 g, 54 mols 2 equivalents), dodecanethiol (0.28 g, 1% w/w) and AIBN (0.28 g, 1% w/w) were dissolved in anhydrous THF (280 ml). The solution was degassed via the freeze-pump-thaw method and purged with nitrogen. The flask was sealed and the solution stirred with heating at 60° C. for 12 hours. The solution was then concentrated under vacuum and added dropwise to vigorously stirring chilled (−20° C.) hexane to give the polymer as clear oil. The precipitate was then filtered off and washed with a further amount of chilled non-solvent to give a clear viscous polymer (18.2 g, 65%)

Example 7

Functionalisation with Epichlorohydrin

The previously prepared polymers (2 g, 3.2 mmol equivalents based on amine level) was dissolved in water (20 ml). Epichlorohydrin (0.3 g, 3.2 mmols, 1 equivalent) was added to the solution and stirring was continued at room temperature for either 2 or 4 hours before the solution was acidified with HCl solution to pH 4.

Example 8

Fabric Treatment with Homopolymer of 2-aminoethyl Methacrylate (Epichlorohydrin:Amine Ratio 1:1)

The polymer was pad-applied at 1% o.w.f. at pH 8.4 to a printed cellulosic fabric, dried at 110° C. for 10 minutes. The fabric, along with an untreated control, was subjected to repeated washing in a Quickwash™ testing machine.

After one hour, the fabric was removed and the deterioration in colour measured on a Datacolor Microflash™ 200d spectrophotometer. Standard deviation shown in brackets.

| Untreated fabric | red ΔE | 9.96 (0.54) |
| | black ΔE | 13.61 (0.42) |
| Treated fabric | red ΔE | 8.38 (0.53) |
| | black ΔE | 12.23 (0.70) |

The lower values of ΔE for the treated cloth show that its properties have been improved by the treatment.

Example 9

Fabric Treatment with Copolymer of 2-(tert-butylamino)ethyl Methacrylate and Poly(Ethylene Glycol) Methacrylate, Monomer Ratio 1:3 (Epichlorohydrin:Amine Ratio 1:2)

The test performed was as in Example 8. The following results were obtained.

| Untreated fabric | red ΔE | 7.01 (0.42) |
| | black ΔE | 10.40 (0.31) |
| Treated fabric | red ΔE | 4.83 (0.26) |
| | black ΔE | 7.64 (0.49) |

Example 10

Paper Treatment with Copolymer of 2-(tert-butylamino)ethyl Methacrylate and Poly(Ethylene Glycol) Methacrylate, Monomer Ratio 1:3 (Epichlorohydrin:Amine Ratio 1:2)

Pad-applied to paper at 1% o.w.f. at pH 8.4 and dried at 110° C. for ten minutes. The paper was then soaked in water and the tensile strength measured on a Testometric AX350 Universal Tester. An untreated sample was used as control.

| Untreated paper | 0.450 kgf (0.011) |
| Treated paper | 0.574 kgf (0.022) |

Example 11

Fabric Treatment with Copolymer of 2-(tert-butylamino)ethyl Methacrylate and Poly(Ethylene Glycol) Methacrylate, Monomer Ratio 1:99. (Epichlorohydrin:Amine Ratio 1:2)

The test used was the same as the test in Example 8. The following results were obtained.

| Untreated fabric | red ΔE | 7.98 (0.49) |
| | black ΔE | 10.38 (0.41) |
| Treated sample | red ΔE | 6.99 (0.25) |
| | black ΔE | 8.97 (0.52) |

Example 12

Fabric Treatment with Copolymer of 2-Aminoethyl Methacrylate and Poly(Ethylene Glycol) Methacrylate, Monomer Ratio 5:95. (Epichlorohydrin:Amine Ratio 1:1)

The test used was the same as the test in Example 8. The following results were obtained.

| Untreated fabric | red ΔE | 7.97 (0.24) |
| | black ΔE | 11.29 (0.38) |
| Treated fabric | red ΔE | 7.20 (0.33) |
| | black ΔE | 11.12 (0.45) |

The invention claimed is:

1. A fabric treatment composition which comprises an azetidinium functionalised polymer containing secondary amine groups and a textile compatible carrier, wherein the monomers of the polymer comprise:
   a) an amino-acrylate and/or amino-alkacrylate monomer, and,
   b) optionally, further non-amino acrylate and/or alkacrylate monomers, and wherein the textile compatible carrier is a detergent active compound or a textile softening or conditioning agent; and wherein the detergent active compound is selected from soap and non-soap anionic, cationic, nonionic, amphoteric and zwitterionic detergent active compounds, and mixtures thereof; and wherein the textile softening or conditioning agent is a water-insoluble quaternary ammonium compound.

2. A fabric treatment composition according to claim 1 wherein the concentration of the polymer is such as to give 0.01-1% wt on weight of fabric material being treated.

3. A polymer according to claim 1 wherein the amine containing acrylate monomers have the general structure:

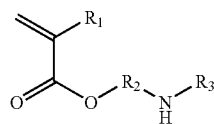

wherein
- $R_1$ is hydrogen or a $C_1$-$C_6$ alkyl,
- $R_2$ is $C_1$-$C_6$ alkyl, alkoxy or repeating units thereof, and
- $R_3$ is hydrogen or $C_1$-$C_6$ alkyl, alkoxy or repeating units thereof.

4. A polymer according to claim 1 wherein the amine containing acrylate monomers include one or more of 2-Aminoethyl methacrylate and 2-(tert-butylamino)ethyl methacrylate.

5. A polymer according to claim 1 wherein the non-amino acrylate and/or alkacrylate monomers are of the general formula:

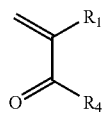

where:
- $R_1$ is hydrogen or a $C_1$-$C_6$ alkyl, alkoxy or repeat units thereof and
- $R_4$ is a functional group does not contain an amine.

6. A polymer according to claim 5 wherein $R_4$ is a polyalkyleneglycol.

7. A polymer according to claim 6 wherein the non-amino monomer is one or more of
- poly(ethyleneglycol)methacrylate, poly(propyleneglycol) methacrylate,
- poly(ethyleneglycol)acrylate, and
- poly(propylene glycol)acrylate.

8. A polymer according to claim 5 wherein $R_4$ is poly(dialkyl siloxane) or poly(alklene glycol) fatty ether.

9. A polymer according to claim 5 wherein $R_4$ is one or more of one or more of:
- 2,2,3,3,4,4,5,5-Octafluoropentyl acrylate,
- 2,2,3,3,4,4,5,5-Octafluoropentyl methacrylate,
- 2,2,3,3,4,4-Hexafluorobutyl acrylate,
- 2,2,3,3,4,4-Hexafluorobutyl methacrylate,
- 1,1,3,3,5,5-Hexafluoroisopropyl acrylate, and
- 1,1,3,3,5,5-Hexafluoroisopropyl methacrylate.

* * * * *